J. R. MOFFATT.
TRIMMING MECHANISM FOR SEWING MACHINES.
APPLICATION FILED JUNE 7, 1912.

1,230,753.

Patented June 19, 1917.
5 SHEETS—SHEET 2.

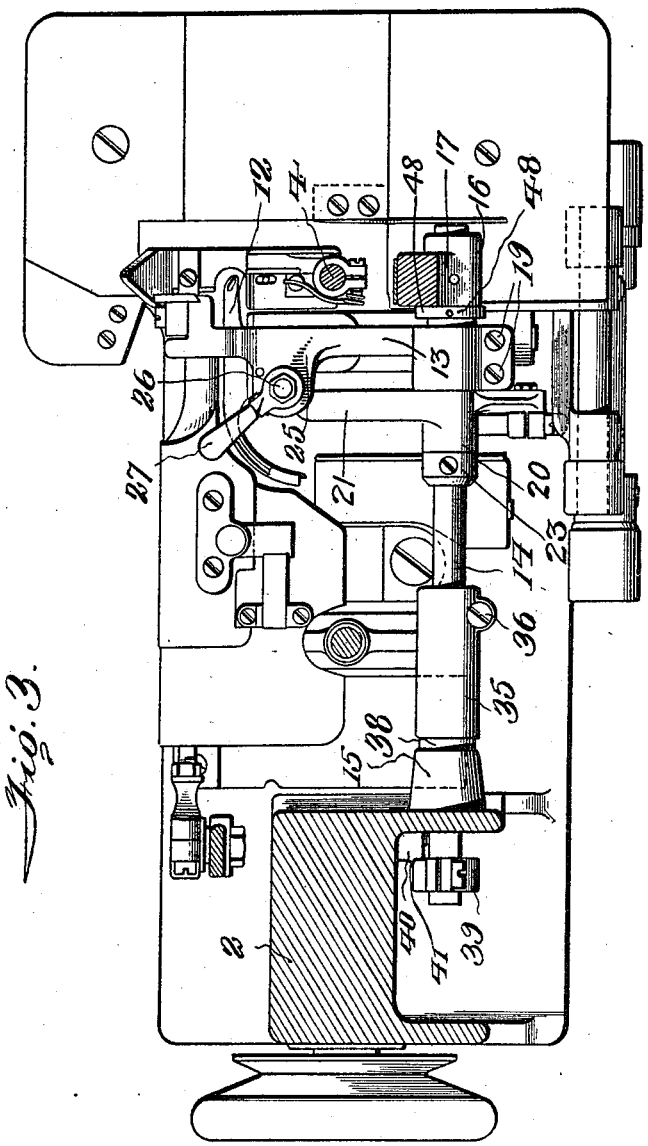

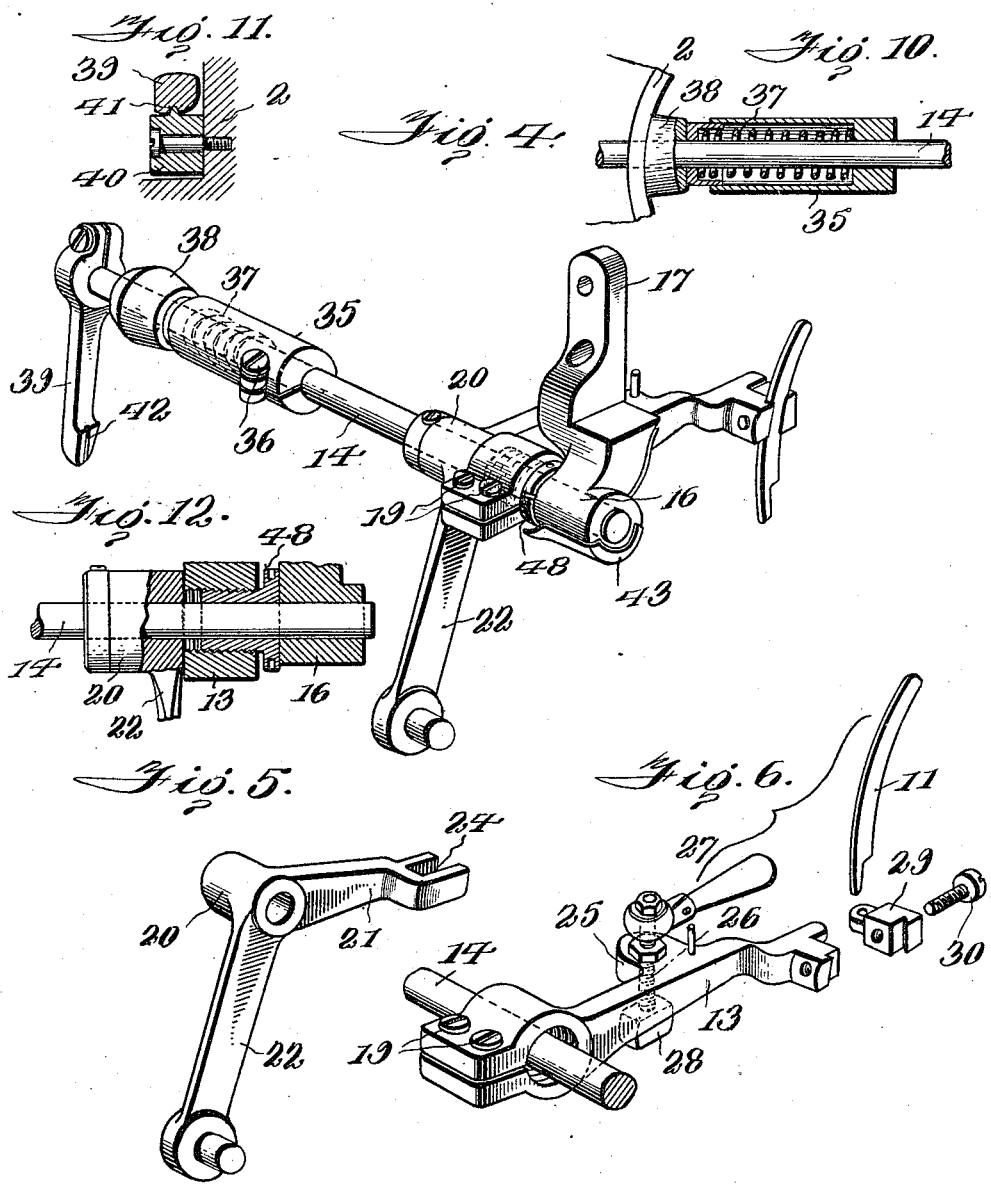

J. R. MOFFATT.
TRIMMING MECHANISM FOR SEWING MACHINES.
APPLICATION FILED JUNE 7, 1912.

1,230,753.

Patented June 19, 1917.

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF NEW YORK.

TRIMMING MECHANISM FOR SEWING-MACHINES.

1,230,753.  Specification of Letters Patent.  Patented June 19, 1917.

Application filed June 7, 1912. Serial No. 702,242.

*To all whom it may concern:*

Be it known that I, JAMES R. MOFFATT, a citizen of the United States, residing at Chicago, in the county of Cook, State of Illinois, have invented certain new and useful Improvements in Trimming Mechanisms for Sewing-Machines, of which the following is a description, reference being had to the accompanying drawing and to the figures of reference marked thereon.

The invention relates to new and useful improvements in sewing machines, and more especially to a trimming mechanism which is adapted to trim the fabric in advance of the stitching mechanism.

An object of the invention is to provide a trimming mechanism wherein the movable blade is suspended above the work support, and is operated by devices connected with the main shaft beneath the work support, whereby the support for the movable trimmer blade may be positioned well above the work support to give plenty of room underneath the same, and also to afford sufficient length of lever-operating room for the trimmer, so that the proper force for operating the same may be obtained.

A further object of the invention consists in providing a trimming mechanism of the above character with devices whereby the movable trimming blade may be disconnected from its operating mechanism and held raised from operative relation to the stationary trimming member.

These and other objects will in part be obvious, and will in part be hereinafter more fully disclosed.

In the drawings which show by way of illustration one embodiment of the invention,—

Fig. 3 is a plan and horizontal sectional view taken at a point above the trimming mechanism;

Fig. 4 is a perspective view of the upper trimming mechanism;

Fig. 5 is a perspective view of the rocking member for operating the movable trimmer blade;

Fig. 6 is a perspective view, showing the arm for carrying the trimmer blade, the trimmer blade and the clamp being separated for the sake of clearness;

Fig. 7 is a perspective view of the presser foot and the strip-depressing finger, these parts being separated for the sake of clearness;

Fig. 10 is a detail showing the spring for holding the trimmer blades in contact; and Fig. 11 is an enlarged detail, showing the locking lug for holding the trimmer raised;

Fig. 12 is a detail in section, showing the abutment collar for the movable trimming member.

Figure 1:
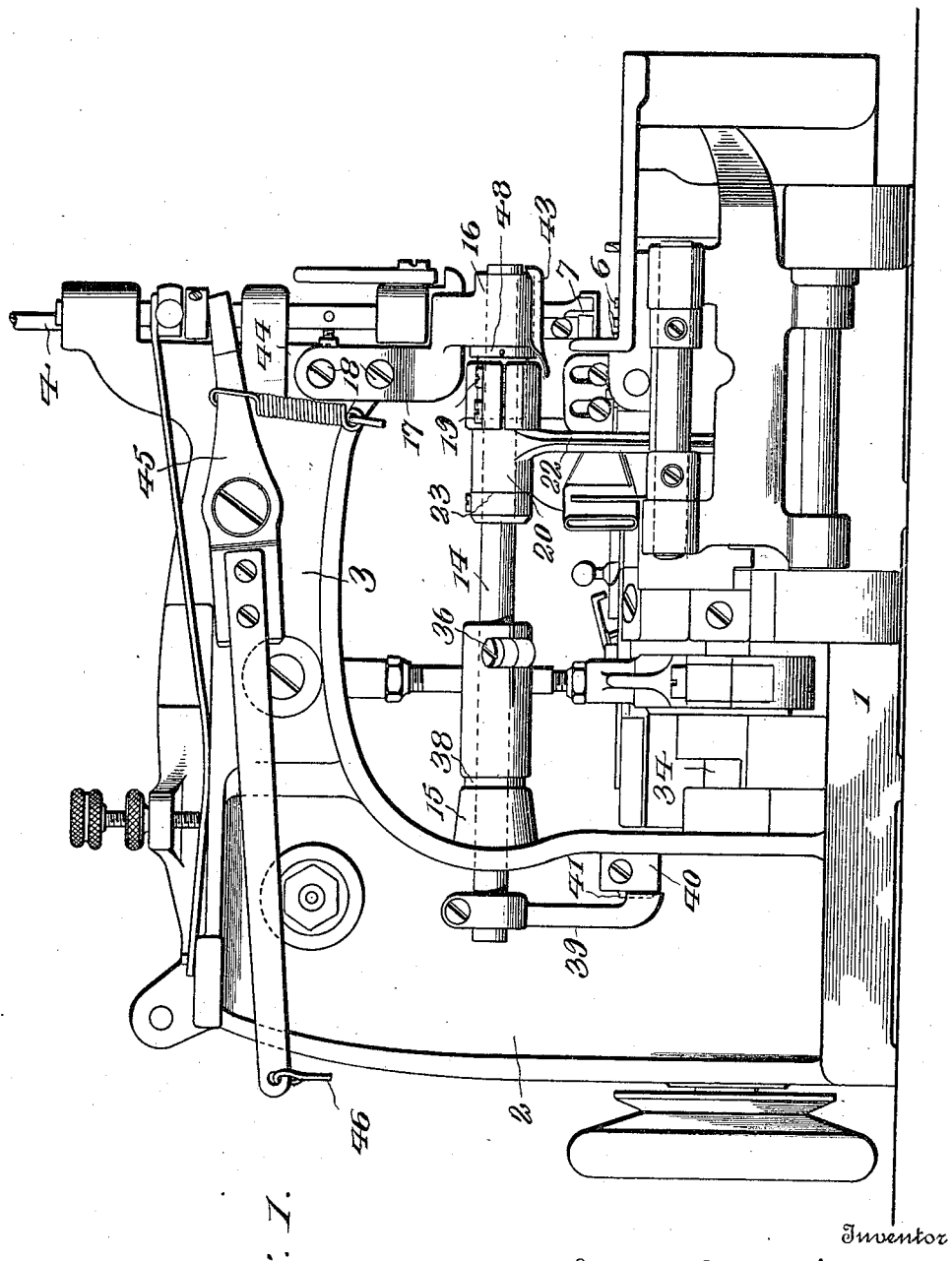
Figure 1 is a rear view of a sewing machine having my invention applied thereto.
Figure 2:
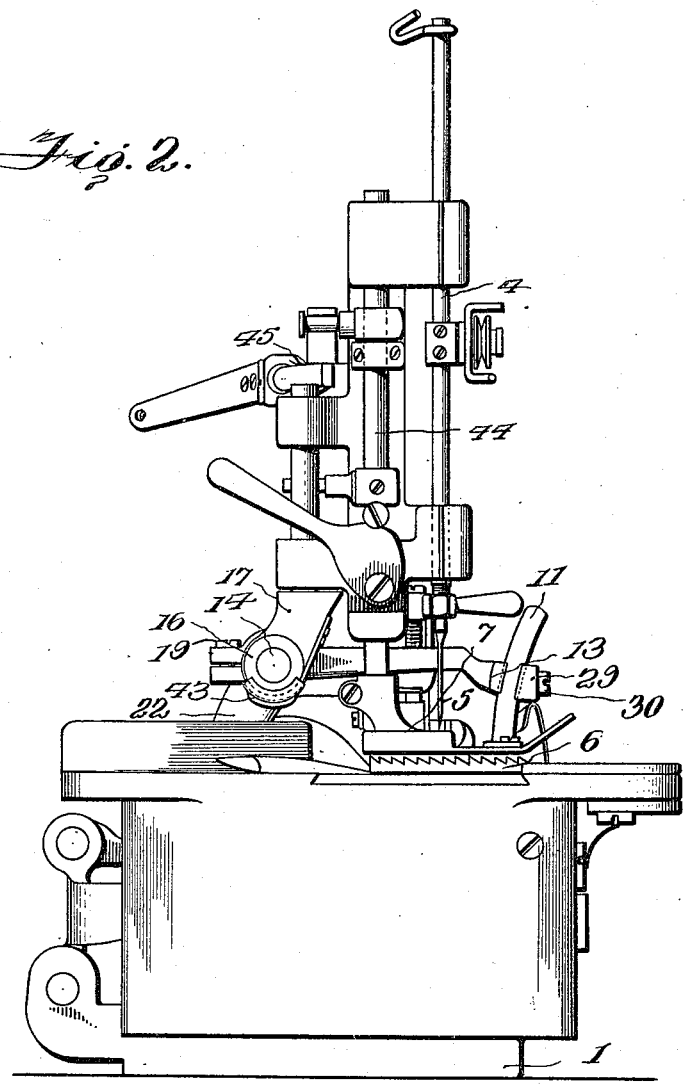
Fig. 2 is an end view of the same.

In carrying out the invention, I have provided a sewing machine which consists of a bed plate 1, from which rises a standard 2, carrying an overhanging arm 3. A needle bar 4 reciprocates in the forward end of the overhanging arm, and carries a needle 5. The machine as herein shown, is preferably used for binding the cut edge of a fabric, and any suitable complemental stitch-forming devices may be used with the needle. It will be understood from certain aspects of the invention, however, that other types of stitching mechanism may be employed.

Figure 8:
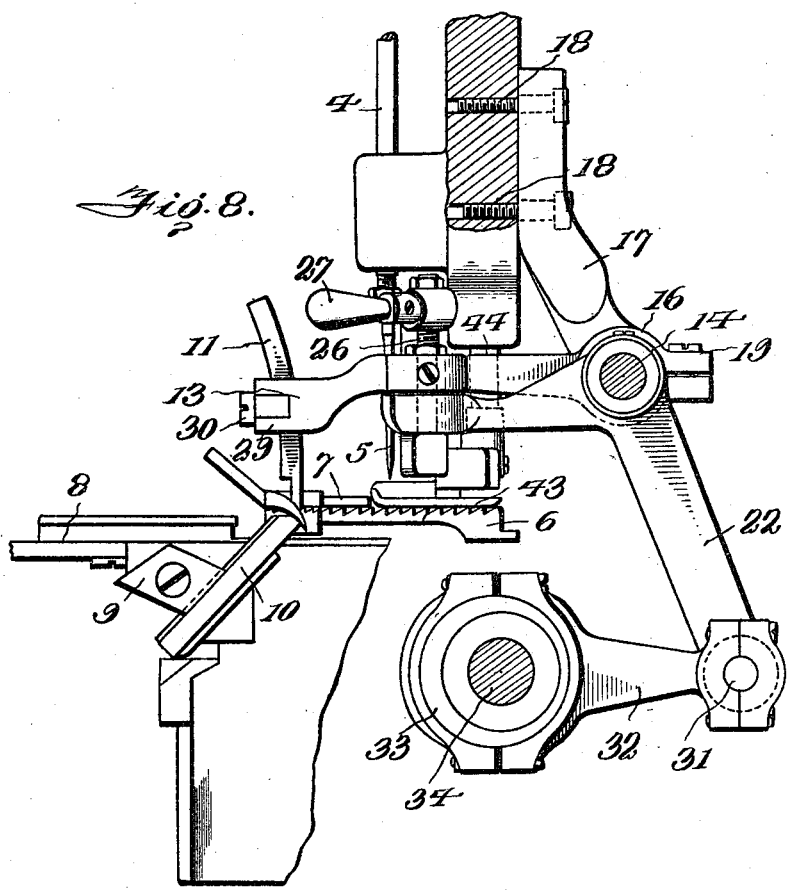
Fig. 8 is a vertical sectional view showing the trimmer-operating mechanism in side elevation, and its relation to the stitching mechanism.
Figure 9:
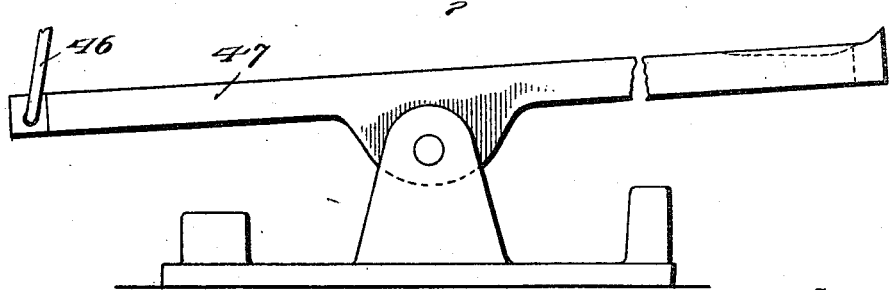
Fig. 9 is a side view of a foot treadle for lifting the presser foot.

The material is fed to the needle by a feed dog 6, which is given the usual four motions. Coöperating with the feed dog 6 is a presser foot 7. The bed plate is provided with standards, on which is mounted a work support 8. The work support 8 carries a trimmer support 9, in which the stationary trimming blade 10 is mounted. A movable trimming blade 11 coöperates with the stationary trimming blade. These blades, as clearly shown in Fig. 8, are disposed in front of the stitching mechanism.

This machine, as above noted, is especially designed for trimming and covering a cut edge with a binding strip. The trimming mechanism, therefore, is located at some distance in advance of the stitching mechanism, so that a binder 12 may be used for guiding a binding strip and placing the same around the cut edge after it is operated upon by the trimming mechanism.

The movable trimmer blade 11 is carried by a supporting arm 13. A shaft 14 is mounted in a projecting lug 15, formed integral with the standard 2 of the machine, and in a bearing 16 carried by a bracket 17, which is secured to the overhanging arm adjacent the needle head. Said bracket 17 is secured by the screws 18 to the overhanging arm. This shaft 14 is loosely journaled in the supporting lug or bearing 15 and the bearing 16. The trimmer-supporting arm 13 is clamped to the shaft 14 by screws 19 through the intermediary of a split sleeve collar 48, so that the oscillations of the arm 13 and the lateral movements thereof, will be imparted to the shaft 14.

The trimmer-operating member 20, as herein shown, is in the form of a rock lever which has an arm 21 adapted to be secured to the trimmer-supporting arm, and an arm 22 which is adapted to be connected to the operating mechanism on the main shaft. This trimmer-operating member 20 is loosely journaled on the shaft 14. Said member is located adjacent the supporting collar for the arm 13, and a collar 23 which is fixed on the shaft 14.

The forward end of the arm 21 is forked as at 24. The supporting arm 13 for the trimmer has a laterally projecting ear 25, which extends over the forked end of the arm 21. A short vertical shaft 26 is supported by the ear 25, and this shaft is turned by a handle 27, which is rigidly secured thereto. The lower end of the shaft 26 is formed with a rectangular securing head 28. The forked end 24 of the arm 21 is so proportioned that when the rectangular head 28 extends lengthwise of the arm 21, said head will pass between the arms of the fork, but when said head is turned at right angles to the plane of the arm 21, said head will then engage the under faces of the forks and securely hold the arm 13 to the operating arm 21 of the rocking member for the upper movable trimmer blade.

The movable trimmer blade 11, as herein shown, is curved, and is secured to the arm 13 by a retaining clamp 29, which is held on the arm by a screw 30.

The arm 22 has a stud 31 at its lower end which is engaged by an eccentric strap 32. The eccentric strap 32 coöperates with an eccentric 33 mounted on the main shaft 34. This main shaft 34, the eccentric 33 and the strap 32 are all disposed beneath the plane of the work support. As the shaft rotates, the eccentric will oscillate the arm 22, which will in turn vibrate the movable trimmer blade.

The shaft 14, as above noted, is freely mounted in its supporting bearings. A sleeve 35 surrounds said shaft and is clamped thereto by a screw 36. A portion of said sleeve is bored out so as to receive a spring 37. This spring bears at one end against the end of the sleeve, and at its other end against a loose collar 38, which rests against the bearing 15 for the shaft 14. This spring normally presses the shaft 14 longitudinally in a direction so as to hold the movable trimmer blade in contact with the stationary trimmer blade.

On the end of the shaft 14 is an arm 39. The standard 2 is formed at each side thereof with projecting ribs, and the bearing 15 is carried by one of these ribs. The shaft 14, therefore, projecting through the bearing and rib is exposed so that the arm 39 may be mounted thereon and have a limited swinging motion relative to the standard. A lug 40 is secured to the standard 2, and is provided with a rib 41, adapted to engage a groove 42 formed in the lower end of the arm 39.

When the trimmer-supporting member 13 is disconnected from the operating rocker member 20, it may be raised and as the movable trimmer blade is raised, the shaft 14 will be oscillated, which will bring the arm 39 into contact with the lug 40 and the rib 41 will engage the groove 42, and thus hold the trimmer blade in raised position. The spring 37 will allow the shaft to yield, so that the groove may engage the rib.

The bracket 17 which supports the outer end of the shaft 14 is provided with an oil guard 43, which extends underneath the bearing 16, and serves as a means for catching any oil dripping from the bearing and directs the same to one side of the work support on which the material being stitched lies.

The presser foot 7 is carried by a presser bar 44 and said presser bar is raised and lowered by a lever 45 to which is attached a rod 46. The opposite end of the rod 46 is attached to a foot treadle 47.

In the operation of my device, the rotating shaft 34 will through the eccentric strap 32, oscillate the arm 22 and said arm 22 in turn will vibrate or oscillate the arm 21. When the trimmer-supporting member 13 is attached to the arm 21, then the upper trimming member will vibrate and the fabric will be trimmed in advance of the stitching mechanism. As soon as the trimmed edge passes the trimming mechanism, the edge will be covered by a binding strip led through the binder 12, and the binding strip will be stitched to the material.

When it is desired to render the trimmer inoperative, the supporting arm 13 therefor is disconnected from the vibrating arm 21, and said arm 13 is raised, which will throw the arm 39 into locking engagement with the rib on the lug 40, and thus the upper trimming blade will be held in inoperative position.

It will be noted from the above description, that I have provided a trimming mechanism wherein the support for the operating lever is carried by the overhanging arm, and may, therefore, be disposed at some distance above the work support, so as to give a long leverage to the arm which actuates the trimmer blade. Furthermore, by this arrangement of the parts, I am able to direct a binding strip underneath the trimmer support from the rear of the machine to the binder. The arrangement of the binder and the parts of the trimming mechanism relative to the stitching mechanism, form no part of the present invention, but are shown, described and claimed in my co-pending application filed of even date herewith Serial No. 702,243.

There is one other feature in connection with my machine, which is of considerable importance in connection with trimming devices, more particularly wherein a movable blade coöperates with a fixed blade to secure a shearing cutting action. In devices of this character as heretofore constructed, it has been customary to provide a spring for forcing the movable blade toward the stationary blade to hold said blades in proper coöperative action. In order that the blades may be pressed into contact with a sufficient force to shear the fabric, the spring is necessarily of considerable tension, which causes excessive wear between the contacting parts of the trimmer, and especially the guiding-finger or point of the trimming blade. I have provided means whereby the proper spring pressure may be employed, and the undue pressure between the blades, avoided.

This means, as herein illustrated, consists of a collar 48 which is threaded into the arm 13 carrying the movable blade. The hub of the arm 13 is cut-away and threaded to receive the collar. The screws 19 are loosened and the collar can be adjusted in and out of the arm, after which the screws are turned up to firmly hold the collar in adjusted positions. This collar is adapted to engage the bearing 16 of the bracket 17. In the setting of my trimmer, the two blades are brought into contact, and the tension of the spring 37 adjusted by shifting the sleeve 35 until the blades will form a proper shearing action on a thin piece of material, such as tissue paper, after which the collar is adjusted until it bears against the arm 16, when it is locked by tightening the screws 19. This collar relieves the knives of the excessive spring pressure as the force of the end-thrust of the shaft 14, will be taken up by the bearing 16 and the collar 48. The collar 48 is a split collar and is threaded into the arm 13. When the screws 19 are turned, the arm 13 and collar 48 will be firmly clamped to the shaft 14 so that the shaft turns with this arm and also moves endwise therewith.

The collar 48 will then take the end-thrust of the shaft 14, and yet permit the movable blade to be spring-pressed toward the stationary blade with sufficient force to secure a proper shearing action. In other words, I have provided a mechanical device to receive the pressure of the spring, so that the pressure is taken away from the cutting edge, which would have the effect of springing the knives and which would also cause the knives to wear out at their frictional or contacting point.

It is obvious that minor changes in the details of construction may be made, without departing from the spirit of the invention as set forth in the appended claims.

Having thus described my invention, what I claim as new and desire to secure by Letters Patent, is:—

1. A trimming mechanism including in combination, a bed plate, a work support, a standard carried by the bed plate, an overhanging arm mounted on the standard, a shaft, bearings carried by the standard and the overhanging arm, a trimmer blade, an arm attached to said shaft for supporting said blade, a member loose on said shaft, means for vibrating said member, and means for connecting and disconnecting said member to the arm supporting the trimmer blade and at a point adjacent said blade.

2. A trimming mechanism including in combination, a bed plate, a work support, a standard carried by the bed plate, an overhanging arm mounted on the standard, a shaft, bearings carried by the standard and the overhanging arm, a trimmer-supporting arm carried by said shaft, a trimmer blade supported by said arm, a rocking member having an arm adapted to be detachably connected with the trimmer-supporting arm, an arm extending beneath the work support, means connected with said arm beneath said work support for vibrating said rocking member, and means for yieldingly moving said shaft longitudinally, an arm mounted on the end of the shaft, and a locking lug for engaging said arm to hold said trimmer blade in raised position when disconnected from the rocking member.

3. A trimming mechanism including in combination, a bed plate, a work support, a standard carried by the bed plate, an overhanging arm mounted on the standard, a shaft, bearings carried by the standard and the overhanging arm for supporting said shaft, a trimmer-supporting arm carried by said shaft, a trimmer blade mounted on said arm, a stationary trimmer blade coöperating therewith, a rocking member loosely mounted on said shaft and having an arm adapted to be detachably connected with the supporting arm for the trimming member adjacent said trimming member, said rocking member having a second arm extending beneath the work support, a main shaft beneath the work support, an eccentric carried thereby, and a strap coöperating with said eccentric and connected to said arm extending beneath the work support.

4. A trimming mechanism including in combination, a bed plate, a work support, a standard carried by the bed plate, an overhanging arm mounted on the standard, a shaft, bearings carried by the standard and the overhanging arm for supporting said shaft, a trimmer-supporting arm carried by said shaft, a trimmer blade mounted on said arm, a stationary trimmer blade coöperating therewith, a rocking member loosely mounted on said shaft and having an arm adapted to be detachably connected with the supporting arm for the trimming member, said rocking member having a second arm extending beneath the work support, a main shaft beneath the work support, an eccentric carried thereby, a strap coöperating with said eccentric and connected to said arm extending beneath the work support, and a spring for moving said shaft endwise for yieldingly holding the trimmer blades in contact.

5. A trimming mechanism including in combination, a bed plate, a work support, a standard carried by the bed plate, an overhanging arm mounted on the standard, a shaft, bearings carried by the standard and the overhanging arm for supporting said shaft, a trimmer-supporting arm carried by said shaft, a trimmer blade mounted on said arm, a stationary trimmer blade coöperating therewith, a rocking member loosely mounted on said shaft and having an arm adapted to be detachably connected with the supporting arm for the trimming member, said rocking member having a second arm extending beneath the work support, a main shaft beneath the work support, an eccentric carried thereby, a strap coöperating with said eccentric and connected to said arm extending beneath the work support, a spring for moving said shaft endwise for yieldingly holding the trimmer blades in contact, an arm carried by the end of said shaft, and a locking lug coöperating with said arm for holding the trimmer in raised position when disconnected from its actuating mechanism.

6. A trimming mechanism including in combination a stationary blade, a movable blade, a spring for forcing the movable blade against the stationary blade and a member adjustable relative to the stationary blade for limiting the thrust of the movable blade toward said stationary blade.

7. A trimming mechanism including in combination a stationary blade, a movable blade, an arm carrying said movable blade, a shaft supporting said arm, a spring for moving the shaft endwise to hold the movable blade in contact with the stationary blade and a collar adjustable relative to the stationary blade for limiting the endwise thrust of the shaft and for determining the lateral shearing pressure of the movable blade against the stationary blade.

In testimony whereof, I affix my signature, in the presence of two witnesses.

JAMES R. MOFFATT.

Witnesses:
C. McNeil,
A. B. Clothier.

Copies of this patent may be obtained for five cents each, by addressing the "Commissioner of Patents, Washington, D. C."